(12) United States Patent
Hsieh et al.

(10) Patent No.: US 10,127,426 B2
(45) Date of Patent: Nov. 13, 2018

(54) FINGERPRINT DETECTOR

(71) Applicant: AU Optronics Corporation, Hsin-Chu (TW)

(72) Inventors: Tsung-Hsien Hsieh, Hsin-Chu (TW); Jeng-Yi Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 57 days.

(21) Appl. No.: 15/460,605

(22) Filed: Mar. 16, 2017

(65) Prior Publication Data
US 2018/0082100 A1    Mar. 22, 2018

(30) Foreign Application Priority Data
Apr. 12, 2016    (TW) .............................. 105111307 A

(51) Int. Cl.
    *G06K 9/00*    (2006.01)
    *G06K 9/20*    (2006.01)
(52) U.S. Cl.
    CPC ........... *G06K 9/0004* (2013.01); *G06K 9/209* (2013.01); *G06K 9/2027* (2013.01)
(58) Field of Classification Search
    None
    See application file for complete search history.

(56) References Cited

U.S. PATENT DOCUMENTS

| 6,243,155 | B1 * | 6/2001 | Zhang | .................... G02F 1/135 |
| | | | | 257/57 |
| 8,941,598 | B2 * | 1/2015 | Lai | ........................ G06F 3/0416 |
| | | | | 345/173 |
| 9,013,414 | B2 | 4/2015 | Kung et al. | |
| 9,558,391 | B2 | 1/2017 | Cheng et al. | |
| 9,971,456 | B2 * | 5/2018 | Abileah | ................ G06F 3/0421 |

(Continued)

FOREIGN PATENT DOCUMENTS

| TW | 201234338 A | 8/2012 |
| TW | 201604704 A | 2/2016 |

OTHER PUBLICATIONS

Taiwan Patent Office "Office Action" dated Dec. 29, 2016, Taiwan.

*Primary Examiner* — Hadi Akhavannik
(74) *Attorney, Agent, or Firm* — WPAT, PC

(57) ABSTRACT

A fingerprint detector includes a driving circuit, a sensing array, a gate driving circuit, a reading circuit, a first light emitting structure and a second light emitting structure. The first and the second light emitting structures are isolated from one another. The driving circuit provides power to the first and the second light emitting structures. The sensing array includes a plurality of first light sensing elements disposed under the first light emitting structure and a plurality of second light sensing elements disposed under the second light emitting structure. Each of the light sensing elements generates a light sensing voltage according to scanning light received. The gate driving circuit drives a plurality of rows of the light sensing elements sequentially through a plurality of gate lines. The reading circuit sequentially or synchronously reads the light sensing voltages generated by light sensing elements in different columns of a same row driven by the gate driving circuit.

11 Claims, 12 Drawing Sheets

(56) References Cited

U.S. PATENT DOCUMENTS

2002/0196036 A1* 12/2002 Toyoshima .......... G06K 9/0002
                                                          324/702
2005/0141048 A1*  6/2005 Mizutani .............. G06K 9/0002
                                                          358/474
2014/0111467 A1   4/2014 Chen et al.

* cited by examiner

FINGERPRINT DETECTOR

BACKGROUND

Technical Field

The present invention relates to a fingerprint detector, and in particular, to a fingerprint detector for preventing a voltage provided to a light emitting structure (LES) from affecting accuracy of reading of a light sensing voltage.

Related Art

FIG. 1 is a schematic diagram of a fingerprint detector 100 in the prior art. The fingerprint detector 100 includes a backlight module 110, a sensing array 120, and a reading module 130. The sensing array 120 and the reading module 130 are disposed above the backlight module 110. The sensing array 120 includes a plurality of light sensing elements 122. When the backlight module 110 emits scanning light, the scanning light is transmitted towards an object on a surface of the fingerprint detector 100 and is reflected by the object (e.g. a finger), and the plurality of light sensing elements 122 generate corresponding light sensing voltages according to the scanning light reflected by the finger. Uneven distribution of lines on a surface of a finger (a fingerprint) causes non-uniform light intensities of the scanning light received by the plurality of light sensing elements 122, and further causes the generation of different light sensing voltages. Therefore, by means of reading, by the reading module 130, the light sensing voltages generated by the plurality of light sensing elements 122, features of a fingerprint can be presented. However, the sensing array 120 of the fingerprint detector 100 is disposed above the backlight module 110, and therefore, the scanning light may be unable to be uniformly incident on the surface of the object, causing an error of the interpretation of the features of the surface of the object. Therefore, how to accurately interpret features of a surface of an object is a problem to be resolved.

SUMMARY

An embodiment of the present invention provides a fingerprint detector. The fingerprint detector includes a first light emitting structure (LES), a second LES, a driving circuit, a sensing array, a gate driving circuit, a reading circuit, and a time sequence control circuit. When an object is in contact with a part of the first LES, the part of the first LES in contact with the object emits first scanning light. When an object is in contact with a part of the second LES, the part of the second LES in contact with the object emits second scanning light. The first LES and the second LES are isolated from each other. The first LES and the second LES are coplanar and do not affect each other. The driving circuit is coupled to the first LES and the second LES, and can provide power to the first LES and the second LES.

The sensing array includes a plurality of first light sensing elements and a plurality of second light sensing elements. The plurality of first light sensing elements are disposed under the first LES, and each of the first light sensing elements can generate a first light sensing voltage according to the received first scanning light. The plurality of second light sensing elements are disposed under the second LES, and each of the second light sensing elements can generate a second light sensing voltage according to the received second scanning light.

The gate driving circuit includes a plurality of gate lines, and each of the gate lines is coupled to a plurality of light sensing elements of a same row, and the gate driving circuit can sequentially drive a plurality of rows of light sensing elements through the plurality of gate lines. The reading circuit includes a plurality of first read lines, a plurality of second read lines, and a reading circuit. Each of the first read lines is coupled to a plurality of light sensing elements of a same column in the first light sensing elements, and each of the second read lines is coupled to a plurality of light sensing elements of a same column in the second light sensing elements. The reading circuit is coupled to the plurality of first read lines and the plurality of second read lines, and is configured to, when the gate driving circuit drives a row of light sensing elements, sequentially or synchronously read, through the plurality of first read lines, first light sensing voltages generated by first light sensing elements in different columns of the driven row of first light sensing elements, and/or sequentially or synchronously read, through the plurality of second read lines, second light sensing voltages generated by second light sensing elements in different columns of the driven row of second light sensing elements.

The time sequence control circuit is coupled to the driving circuit, the gate driving circuit, and the reading circuit, and can control the driving circuit, the gate driving circuit, and the reading circuit.

Another embodiment of the present invention provides a fingerprint detector. The fingerprint detector includes a LES, a driving circuit, a sensing array, a gate driving circuit, a reading circuit, and a time sequence control circuit. When an object is in contact with a part of the LES, the part of the LES in contact with the object emits scanning light.

The driving circuit is coupled to the LES, and can provide power to the LES that is needed when the LES emits light. The sensing array includes a plurality of light sensing elements disposed under the LES, and each of the light sensing elements is configured to generate a light sensing voltage according to the received scanning light. The gate driving circuit includes a plurality of gate lines, and each of the gate lines is coupled to a plurality of light sensing elements of a same row in the plurality of light sensing elements, and the gate driving circuit can sequentially drive a plurality of rows of light sensing elements through the plurality of gate lines.

The reading circuit includes a plurality of reading lines and a reading circuit. Each of the read lines is coupled to a plurality of light sensing elements of a same column in the plurality of light sensing elements. The reading circuit is coupled to the plurality of read lines, and can, when the gate driving circuit drives a row of light sensing elements, sequentially or synchronously read, through the plurality of read lines, light sensing voltages generated by light sensing elements in different columns of the row of light sensing elements.

The time sequence control circuit is coupled to the driving circuit, the gate driving circuit, and the reading circuit, and can control the driving circuit, the gate driving circuit, and the reading circuit.

The driving circuit provides an AC voltage to the LES in a first time segment. The gate driving circuit sequentially drives the plurality of rows of light sensing elements through the plurality of gate lines in a second time segment. In the second time segment, the driving circuit stops providing the AC voltage to the LES, and the first time segment and the second time segment do not overlap.

Still another embodiment of the present invention provides a fingerprint detector. The fingerprint detector includes an LES, a driving circuit, a sensing array, a gate driving circuit, a reading circuit, and a time sequence control circuit. When an object is in contact with a part of the LES, the part of the LES in contact with the object emits scanning light.

The driving circuit is coupled to the LES, and can provide power to the LES that is needed when the LES emits light. The sensing array includes a plurality of light sensing elements disposed under the LES, and each of the light sensing elements is configured to generate a light sensing voltage according to the received scanning light. The gate driving circuit includes a plurality of gate lines, and each of the gate lines is coupled to a plurality of light sensing elements of a same row in the plurality of light sensing elements, and the gate driving circuit can sequentially drive a plurality of rows of light sensing elements through the plurality of gate lines.

The reading circuit includes a plurality of reading lines and a reading circuit. Each of the read lines is coupled to a plurality of light sensing elements of a same column in the plurality of light sensing elements. The reading circuit is coupled to the plurality of read lines, and can, when the gate driving circuit drives a row of light sensing elements, sequentially read, through the plurality of read lines, light sensing voltages generated by light sensing elements in different columns of the row of light sensing elements.

The time sequence control circuit is coupled to the driving circuit, the gate driving circuit, and the reading circuit, and can control the driving circuit, the gate driving circuit, and the reading circuit.

The driving circuit provides an AC voltage to the LES after the reading circuit reads a corresponding light sensing voltage through a read line and before the reading circuit reads a corresponding light sensing voltage through a next read line, and stops providing the AC voltage to the LES when the reading circuit reads a corresponding light sensing voltage through a read line.

DETAILED DESCRIPTION

Figure 1:
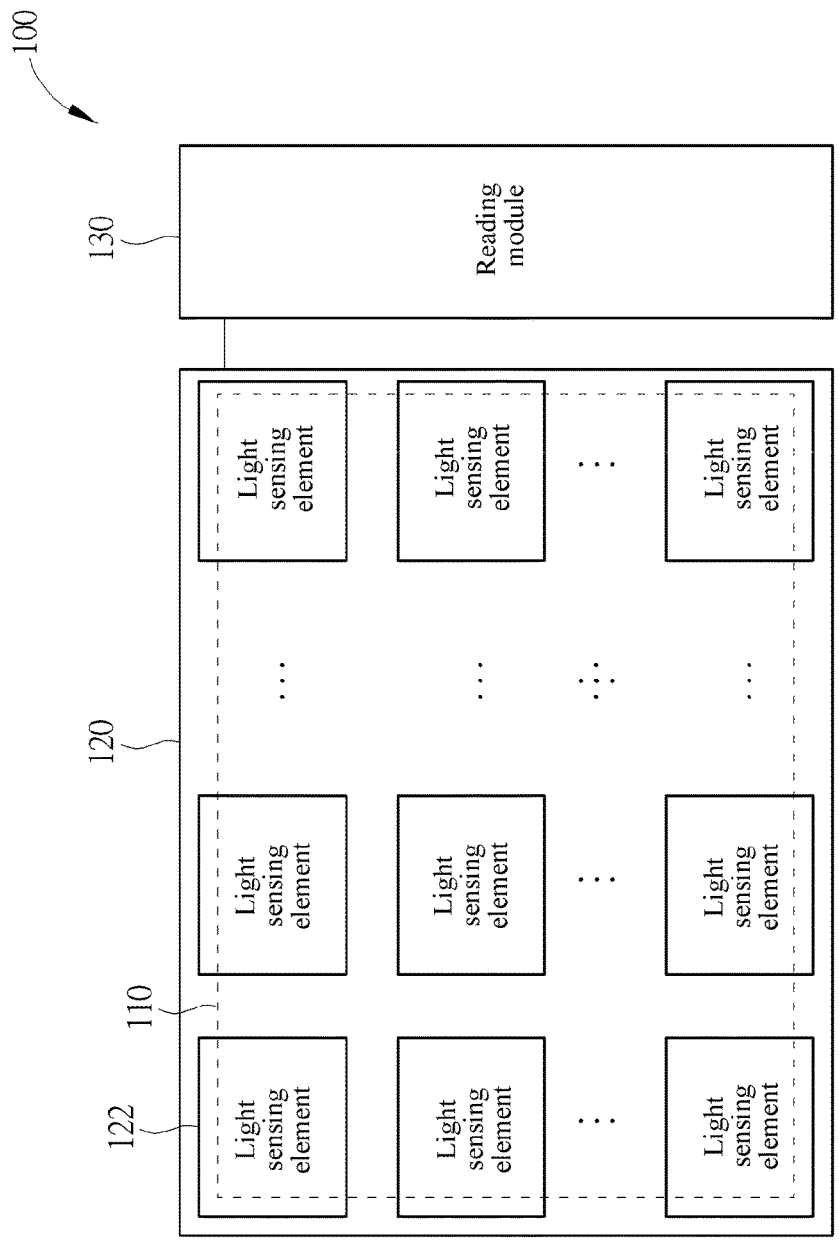
FIG. 1 is a schematic diagram of a fingerprint detector in the prior art.
Figure 2:
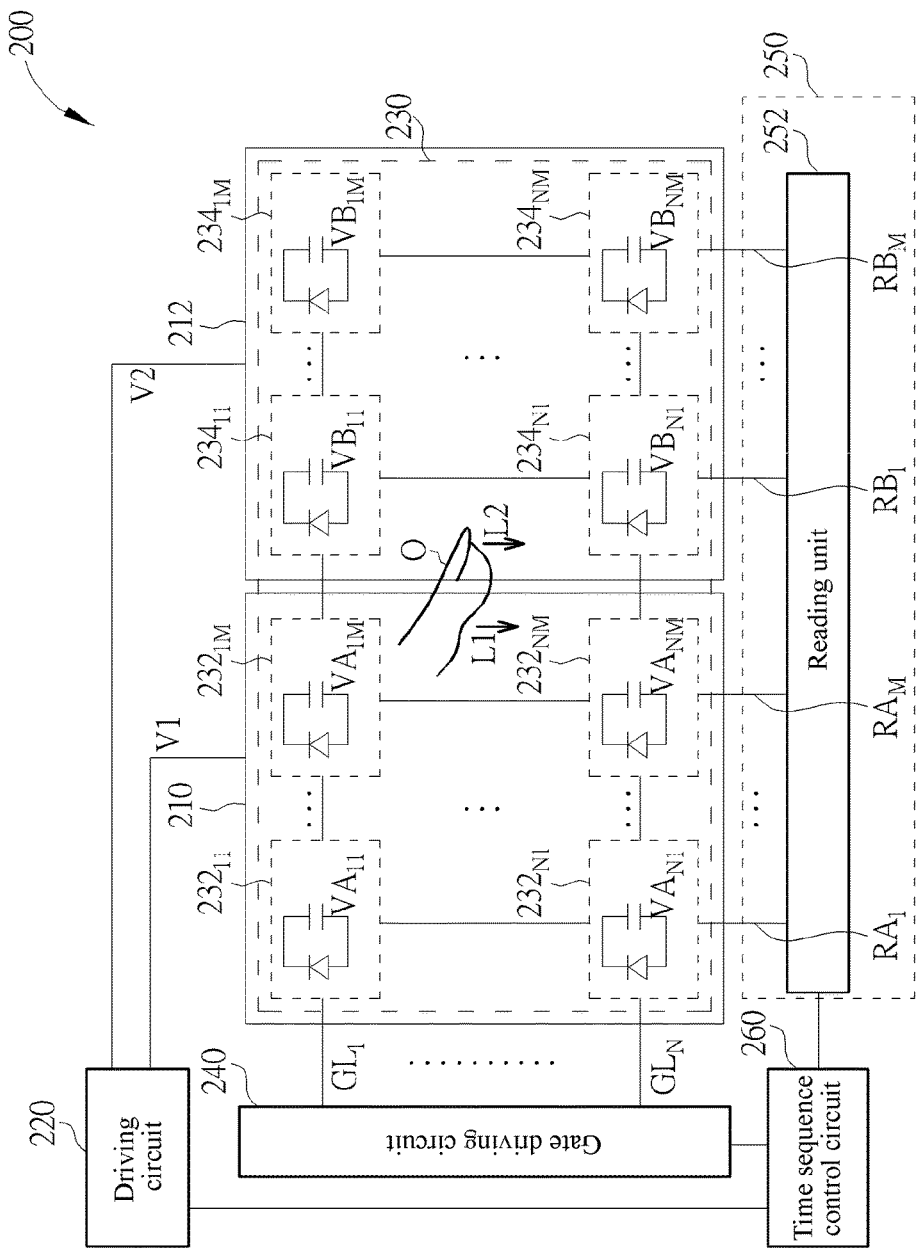
FIG. 2 is a schematic diagram of a fingerprint detector according to an embodiment of the present invention.
Figure 3:
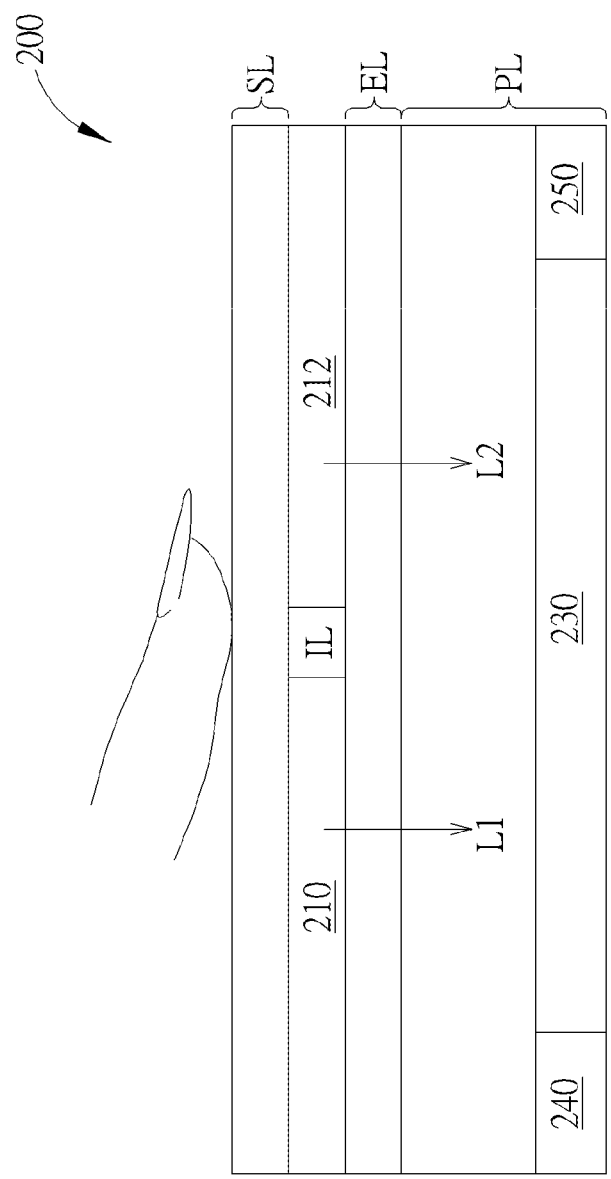
FIG. 3 is a side sectional view of the fingerprint detector of FIG. 2.

FIG. 2 is a schematic diagram of a fingerprint detector 200 according to an embodiment of the present invention, and FIG. 3 is a side sectional view of the fingerprint detector 200 of FIG. 3. The fingerprint detector 200 includes a first LES 210, a second LES 212, a driving circuit 220, a sensing array 230, a gate driving circuit 240, a reading circuit 250, and a time sequence control circuit 260.

When an object (e.g. a finger) is in contact with a part of an LES, an AC input to the LES can be grounded by means of the object, such that the part of the LES in contact with the object emits scanning light. For example, in FIG. 2, a part of the first LES 210 in contact with an object O and a part of the second LES 212 in contact with the object O respectively emit first scanning light L1 and second scanning light L2 towards the sensing array 230.

In FIG. 3, all or partial components of the sensing array 230, the gate driving circuit 240, and the reading circuit 250 are disposed in a component area PL. In order to enable the LESs to be closer to the object in contact with the LESs and further to receive the contact the object in a relatively direct manner, the first LES 210 and the second LES 212 are disposed above the component area PL. The first LES 210 and the second LES 212 may be coplanar, and an electrode layer EL for providing power to the first LES 210 and the second LES 212 is disposed between the component area PL and the first LES 210 and the second LES 212. In FIG. 3, light sensing elements of the sensing array 230 are disposed under the first LES 210 and the second LES 212, such that the light sensing elements can directly receive the scanning light emitted by the first LES 210 and the second LES 212, for example, the first scanning light L1 and the second scanning light L2.

Besides, spatial distribution of the sensing array 230, the gate driving circuit 240, and the reading circuit 250 in the component area PL is merely used for illustration. Specifically, in some embodiments of the present invention, according to a wiring requirement, Thin Film Transistors (TFTs) needed by the gate driving circuit 24 and the reading circuit 250 may be disposed above or under the sensing array 230, or be disposed at a plane the same as a plane of the sensing array 230 but interleaved with the sensing array 230. In some embodiments of the present invention, in order to avoid abrasion of the first LES 210 and the second LES 212 caused by being in contact with the object, a translucent protective layer SL may be further disposed above the first LES 210 and the second LES 212. Moreover, an insulation layer IL may be further disposed between the first LES 210 and the second LES 212, so as to ensure that the first LES 210 and the second LES 212 are isolated from each other and do not affect each other.

In FIG. 2, the first LES 210 and the second LES 212 are isolated from each other. The driving circuit 220 is coupled to the first LES 210 and the second LES 212, and can provide power to the first LES 210 and the second LES 212. The sensing array 230 includes a plurality of first light sensing elements $232_{11}$ to $232_{NM}$ and a plurality of second light sensing elements $234_{11}$ to $234_{NM}$, where M and N are positive integers. The plurality of first light sensing elements $232_{11}$ to $232_{NM}$ are disposed under the first LES 210, and the first light sensing elements $232_{11}$ to $232_{NM}$ can generate first light sensing voltages $VA_{11}$ to $VA_{NM}$ according to the received first scanning light L1. The plurality of second light sensing elements $234_{11}$ to $234_{NM}$ are disposed under the second LES 212, and the second light sensing elements $234_{11}$ to $234_{NM}$ can generate second light sensing voltages $VB_{11}$ to $VB_{NM}$ according to the received second scanning light L2.

The gate driving circuit 240 includes a plurality of gate lines $GL_1$ to $GL_N$, and each of the gate lines $GL_1$ to $GL_N$ is coupled to a plurality of light sensing elements of a same row in the plurality of first light sensing elements $232_{11}$ to $232_{NM}$ and the plurality of second light sensing elements $234_{11}$ to $234_{NM}$. For example, the gate line $GL_1$ is coupled to the first light sensing elements $232_{11}$ to $232_{1M}$ and the second light sensing elements $234_{11}$ to $234_{1M}$ of a same row, the gate line $GL_N$ is coupled to the first light sensing elements $232_{N1}$ to $232_{NM}$ and the second light sensing elements $234_{N1}$ to $234_{NM}$ of a same row, and so on. Moreover, the gate driving circuit 240 can sequentially drive a plurality of rows of light sensing elements through the plurality of gate lines $GL_1$ to $GL_N$.

The reading circuit 250 includes a plurality of first read lines $RA_1$ to $RA_M$, a plurality of second read lines $RB_1$ to $RB_M$, and a reading unit 252. In FIG. 2, a dividing line between the first LES 210 and the second LES 212 is parallel to the plurality of first read lines $RA_1$ to $RA_M$ and the plurality of second read lines $RB_1$ to $RB_M$. Each of the first read lines $RA_1$ to $RA_M$ is coupled to a plurality of light sensing elements of a same column in the plurality of first light sensing elements $232_{11}$ to $232_{NM}$. Each of the second read lines $RB_1$ to $RB_M$ is coupled to a plurality of light sensing elements of a same column in the plurality of second light sensing elements $234_{11}$ to $234_{NM}$. For example, the first read line $RA_1$ is coupled to light sensing elements $232_{11}$ to $232_{N1}$ of a same column in the plurality of first light sensing elements $232_{11}$ to $232_{NM}$, and the second read line $RB_1$ is coupled to light sensing elements $234_{11}$ to $234_{N1}$ of a same column in the plurality of second light sensing elements $234_{11}$ to $234_{NM}$.

The reading unit 252 is coupled to the plurality of first read lines $RA_1$ to $RA_M$ and the plurality of second read lines $RB_1$ to $RB_M$. When the gate driving circuit 240 drives a row of light sensing elements, the reading unit 252 can sequentially or synchronously read, through the plurality of first read lines $RA_1$ to $RA_M$, first light sensing voltages generated by first sensing elements in different columns of a row of first light sensing elements driven by the gate driving circuit 240, and/or can sequentially or synchronously read, through the plurality of second read lines $RB_1$ to $RB_M$, second light sensing voltages generated by second light sensing elements in different columns of a row of second light sensing elements driven by the gate driving circuit 240. For example, when the gate driving circuit 240 drives the first light sensing elements $232_{11}$ to $232_{1M}$ and the second light sensing elements $234_{11}$ to $234_{1M}$ of a same row through the gate line $GL_1$, the reading unit 252 may sequentially read, through the plurality of first read lines $RA_1$ to $RA_M$, the first light sensing voltages $VA_{11}$ to $VA_{1M}$ generated by the first light sensing elements $232_{11}$ to $232_{1M}$ in different columns of a same row, and the reading unit 252 may sequentially read, through the plurality of second read lines $RB_1$ to $RB_M$, the second light sensing voltage $VB_{11}$ to $VB_{1M}$ generated by the second light sensing elements $234_{11}$ to $234_{1M}$ in different columns of a same row.

Figure 4:
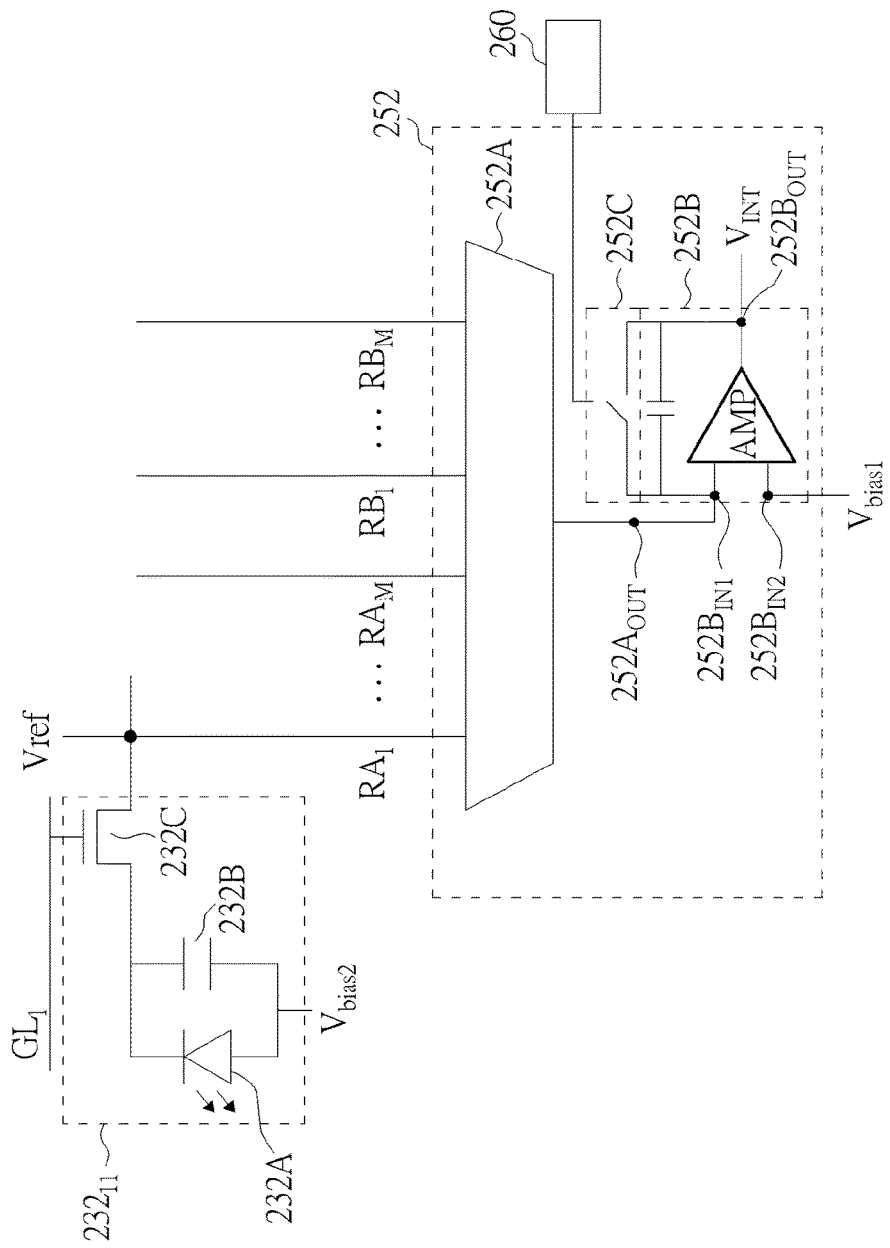
FIG. 4 is a schematic diagram of a reading circuit and a first light sensing element of the fingerprint detector of FIG. 2.

The time sequence control circuit 260 is coupled to the driving circuit 220, the gate driving circuit 240, and the reading circuit 250, and can control operation sequences of the driving circuit 220, the gate driving circuit 240, and the reading circuit 250. FIG. 4 is a schematic diagram of the reading unit 252 and the first light sensing element $232_{11}$ according to the embodiment of the present invention. In the embodiment of FIG. 4, the reading unit 252 includes a multiplexer 252A, an integrator 252B, and a bypass switch 252C. The multiplexer 252A is coupled to the plurality of first read lines $RA_1$ to $RA_M$ and the plurality of second read lines $RB_1$ to $RB_M$, and can enable or disable, according to control of the time sequence control circuit 260, electrical connections between the plurality of first read lines $RA_1$ to $RA_M$ and the plurality of second read lines $RB_1$ to $RB_M$ and an output end $252A_{OUT}$ of the multiplexer 252A. The integrator 252B has a first input end $252B_{IN1}$, a second input end $252B_{IN2}$, and an output end $252B_{OUT}$. The first input end $252B_{IN1}$ of the integrator 252B is coupled to the output end $252A_{OUT}$ of the multiplexer 252A, the second input end $252B_{IN2}$ of the integrator 252B receives a bias $V_{bias1}$, and the output end $252B_{OUT}$ of the integrator 252B can output an integral voltage $V_{IN1}$ according to a current input from the first input end $252B_{IN1}$. In FIG. 4, the integrator 252B may be formed by an amplifier AMP and a capacitor C. The bypass switch 252C has a first end, a second end, and a control end. The first end of the bypass switch 252C is coupled to the first input end $252B_{IN1}$ of the integrator 252B, the second end of the bypass switch 252C is coupled to the output end $252B_{OUT}$ of the integrator 252B, and the control end of the bypass switch 252C is coupled to the time sequence control circuit 260. When the reading unit 252 is not used to read a light sensing voltage, the time sequence control circuit 260 switches on the bypass switch 252C, so as to enable the capacitor of the integrator 252B to return to an initial voltage. When the reading unit 252 is to be used to read a light sensing voltage, the time sequence control circuit 260 switches off the bypass switch 252C, such that an external current can flow into the integrator 252B, and the integrator 252B can output the integral voltage $V_{IN1}$ according to the current input from the first input end $252B_{IN1}$, where the integral voltage $V_{IN1}$ is used as a basis for determining the light sensing voltage.

The first light sensing element $232_{11}$ may include a light sensing component 232A, a capacitor 232B, and a switch 232C. A first end of the switch 232C is coupled to the capacitor 232B and the light sensing component 232A, a second end of the switch 232C is coupled to the first read line $RA_1$, and a control end of the switch 232C is coupled to the gate line $GL_1$. The anode and cathode of the light sensing component 232A are separately coupled to a bias $V_{bias2}$ and the first end of the switch 232C. Besides, two ends of the capacitor 232B are separately coupled to the anode and cathode of the light sensing component 232A. Therefore, a photocurrent generated by the light sensing component 232A according to received light discharges the capacitor 232B, and the first light sensing voltage $VA_{11}$ generated by the first light sensing element $232_{11}$ is a voltage difference between two ends of the capacitor 232B.

In the embodiment of FIG. 4, when the fingerprint detector 200 intends to read the light sensing voltage $VA_{11}$ generated by the first light sensing element $232_{11}$, the gate driving circuit 240 outputs a gate signal $SG_1$ to the gate line $GL_1$, and therefore, the switch 232C of the first light sensing element $232_{11}$ is switched on, the first read line $RA_1$ charges the capacitor 232B of the first light sensing element $232_{11}$, and the capacitor 232B is continuously charged until a voltage of the capacitor 232B is the same as a reference voltage $V_{ref}$ provided by the first read line $RA_1$. At this time, the time sequence control circuit 260 also controls the multiplexer 252A of the reading unit 252 to enable an electrical connection between the first read line $RA_1$ and the output end $252A_{OUT}$ of the multiplexer 252A. Therefore, the integrator 252B also receives a charging current provided by the first read line $RA_1$ to the capacitor 232B of the light sensing element $232_{11}$, and outputs the integral voltage $V_{IN1}$ according to the charging current, where the integral voltage $V_{IN1}$ is used as a basis for determining the light sensing voltage.

In the embodiments of the present invention, each of the light sensing elements may have a structure similar to the structure of the first light sensing element $232_{11}$, and the fingerprint detector 200 may also read, in a manner the same as the foregoing manner of reading the light sensing voltage $VA_{11}$ generated by the first light sensing element $232_{11}$, light sensing voltages generated by different light sensing elements.

However, in some embodiments of the present invention, a light sensing element of the fingerprint detector of the present invention may have a structure different from the structure of the first light sensing element $232_{11}$ shown in FIG. 4, for example, a photocurrent generated by a light sensing component in a light sensing element may charge, instead of discharge, a capacitor in the light sensing element, and in this case, when the fingerprint detector intends to read a light sensing voltage, the capacitor in the light sensing element may be discharged, instead of charged, through a read line. Moreover, a reading circuit may be implemented by using a different architecture, which may be not the same as the reading unit 252 shown in FIG. 4. Specifically, as long as the light sensing elements cooperate with the read lines of the reading circuit and the gate lines of the gate driving circuit so as to enable the fingerprint detector to read the light sensing voltages of the light sensing components by means of driving different gate lines and different read lines, the fingerprint detector of the present invention can operate normally.

In certain embodiments, an LES needs to be driven by a high-voltage current to emit light, for example, positive and negative voltages, a pure positive voltage, or a pure negative voltage, such as an AC whose voltage peak-valley difference may achieve 200V. It is too be noted that a lower voltage voltage may also be applied, the invention is not limited thereto. In order to avoid a high-voltage AC from affecting, by means of a coupling effect, operation of the reading circuit 250 when the driving circuit 220 drives the first LES 210 and the second LES 212, in some embodiments of the present invention, a phase difference between an AC voltage provided by the driving circuit 220 to the first LES 210 and an AC voltage provided by the driving circuit 220 to the second LES 212 may essentially be 180 degrees. In this way, the AC voltage provided by the driving circuit 220 to the first LES 210 and the AC voltage provided by the driving circuit 220 to the second LES 212 have reverse phases, and can compensate with each other, thereby reducing an impact of the high-voltage ACs on the reading circuit 250.

However, in other embodiments of the present invention, an AC voltage provided by the driving circuit 220 to the first LES 210 and an AC voltage provided to the second LES 212 may have no phase difference, and by means of such arrangement, scanning light emitted by the first LES and scanning light emitted by the second LES have a same intensity, and at this time, an impact of the high-voltage ACs on the reading circuit 250 may be reduced by adjusting time sequences for outputting, by the driving circuit 220, the voltages to the first LES 210 and the second LES 212.

Figure 5:
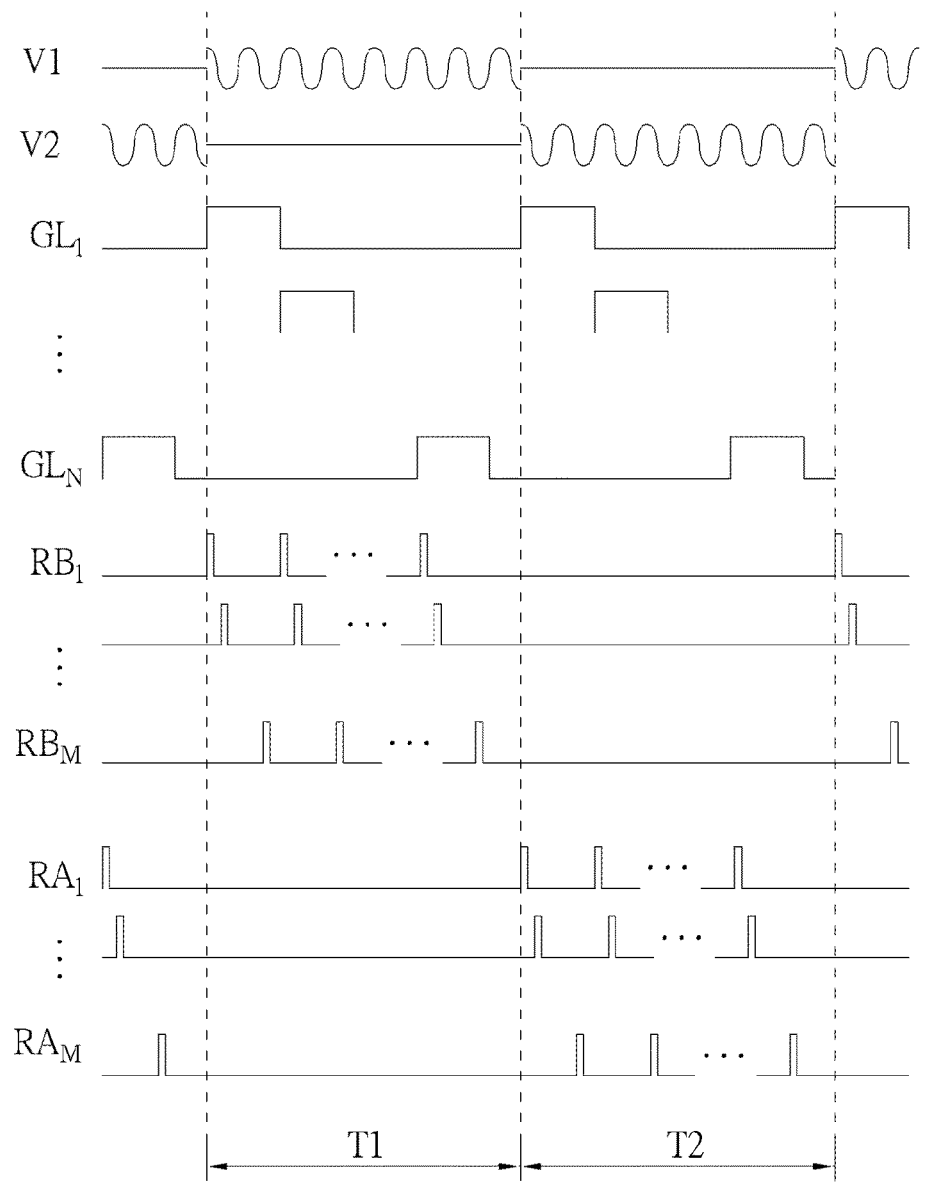
FIG. 5 is an operation time sequence diagram of the fingerprint detector of FIG. 2.

FIG. 5 is an operation time sequence diagram of the fingerprint detector 200 according to another embodiment of the present invention. In a first time segment T1 of FIG. 5, a voltage V1 provided by the driving circuit 220 to the first LES 210 is an AC voltage, and in a second time segment T2, the voltage V1 provided by the driving circuit 220 to the first LES 210 is a direct current (DC) voltage or high impedance. In the first time segment T1, a voltage V2 provided by the driving circuit 220 to the second LES 212 is a DC voltage or high impedance, and in the second time segment T2, the voltage V2 provided by the driving circuit 220 to the second LES 212 is an AC voltage. The first time segment T1 and the second time segment T2 do not overlap.

That is, in the first time segment T1, if the first LES 210 is in contact with an object (e.g. a finger), the first LES 210 emits scanning light. However, in the second time segment T2, even an object is in contact with the first LES 210, the first LES 210 does not emit scanning light. Correspondingly, in the second time segment T2, if the second LES 212 is in contact with an object, the second LES 212 emits scanning light, but in the first time segment T1, even an object is in contact with the second LES 212, the second LES 212 does not emit scanning light.

In this case, the reading unit 252 can read, in the first time segment T1, the light sensing voltages $VB_{11}$ to $VB_{NM}$ generated by the second light sensing elements $234_{11}$ to $234_{NM}$, and can read, in the second time segment T2, the light sensing voltages $VA_{11}$ to $VA_{NM}$ generated by the first light sensing elements $232_{11}$ to $232_{NM}$. Specifically, in the first time segment T1, the gate driving circuit 240 sequentially drives the first light sensing elements $232_{11}$ to $232_{NM}$ and the second light sensing elements $234_{11}$ to $234_{NM}$ through the gate lines $GL_1$ to $GL_N$, and when the gate driving circuit 240 drives the second light sensing elements $234_{11}$ to $234_{1M}$ of a same row through the gate line $GL_1$, the reading circuit 250 sequentially reads, through the plurality of second read lines $RB_1$ to $RB_M$, the second light sensing voltages $VB_{11}$ to $VB_{1M}$ generated by second light sensing elements in different columns of the second light sensing elements $234_{11}$ to $234_{1M}$. In the second time segment T2, the gate driving circuit 240 also sequentially drives the first light sensing elements $232_{11}$ to $232_{NM}$ and the second light sensing elements $234_{11}$ to $234_{NM}$ through the gate lines $GL_1$ to $GL_N$, and when the gate driving circuit 240 drives the first light sensing elements $232_{11}$ to $232_{1M}$ of a same row through the gate line $GL_1$, the reading circuit 250 sequentially reads, through the plurality of first read lines $RA_1$ to $RA_M$, the first light sensing voltages $VA_{11}$ to $VA_{1M}$ generated by first light sensing elements in different columns of the first light sensing elements $232_{11}$ to $232_{1M}$.

In the embodiment of FIG. 5, the reading circuit 250 reads, in the second time segment T2 that the driving circuit 220 does not output the AC voltage to the first LES 210, the first light sensing voltages $VA_{11}$ to $VA_{1M}$ generated by the first light sensing elements $232_{11}$ to $232_{1M}$, and therefore, when the reading circuit 250 reads the first light sensing voltages $VA_{11}$ to $VA_{1M}$, an error caused by an impact of the AC voltage does not occur. Likewise, the reading circuit 250 reads, in the first time segment that the driving circuit 220 does not output the AC voltage to the second LES 212, the second light sensing voltages $VB_{11}$ to $VB_{1M}$ generated by the second light sensing elements $234_{11}$ to $234_{1M}$, and therefore, when the reading circuit 250 reads the second light sensing voltages $VB_{11}$ to $VB_{1M}$, an error caused by an impact of the AC voltage does not occur. In this way, by enabling the first LES 210 and the second LES 212 to emit light at different time segments, the fingerprint detector 200 can avoid reading the first light sensing voltages $VA_{11}$ to $VA_{1M}$ generated by the first light sensing elements $232_{11}$ to $232_{1M}$ when the first LES 210 emits light, and avoid reading the second light sensing voltages $VB_{11}$ to $VB_{1M}$ generated by the second light sensing elements $234_{11}$ to $234_{1M}$ when the second LES 212 emits light, so as to reduce an impact of the high-voltage AC on the reading circuit 250, and improve accuracy of reading, by the reading circuit 250, the light sensing voltages. Besides, according to another embodiment of the present invention, a time segment for applying a drive voltage to an LES may be in H-blanking, by applying the voltage to the LES in the H-blanking, an impact on another component when the component operates is reduced, and accuracy is improved.

Figure 6:
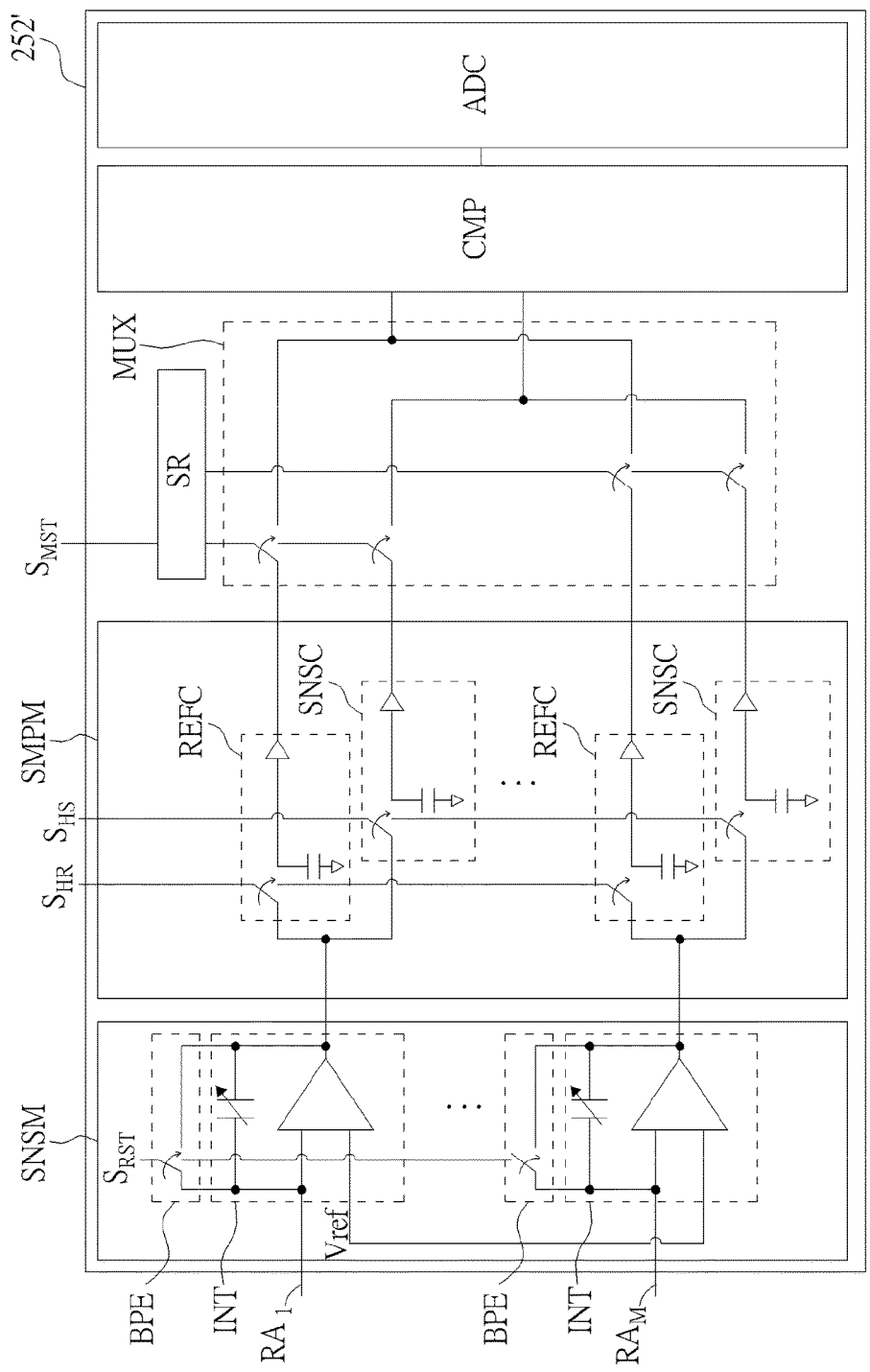
FIG. 6 is a schematic diagram of a reading circuit according to an embodiment of the present invention.

FIG. 6 is a schematic diagram of a reading unit 252' according to another embodiment of the present invention. The reading module 252' includes a sensing module SNSM, a sampling module SMPM, a multiplexer MUX, a shift register SR, a comparator CMP, and an analog to digital converter ADC. In some embodiments of the present invention, in the reading circuit 250, a reading unit 252' may be used to replace the reading unit 252 in FIG. 4. When the reading unit 252' is used to read the light sensing voltages generated by the first light sensing elements $232_{11}$ to $232_{1M}$, the reading unit 252' may be coupled to the first read lines $RA_1$ to $RA_M$, and the sensing module SNSM includes M integrators INT and M bypass components BPE. The sampling module SMPM includes M reference sampling components REFC and M sensing sampling components SNSC.

Figure 7:
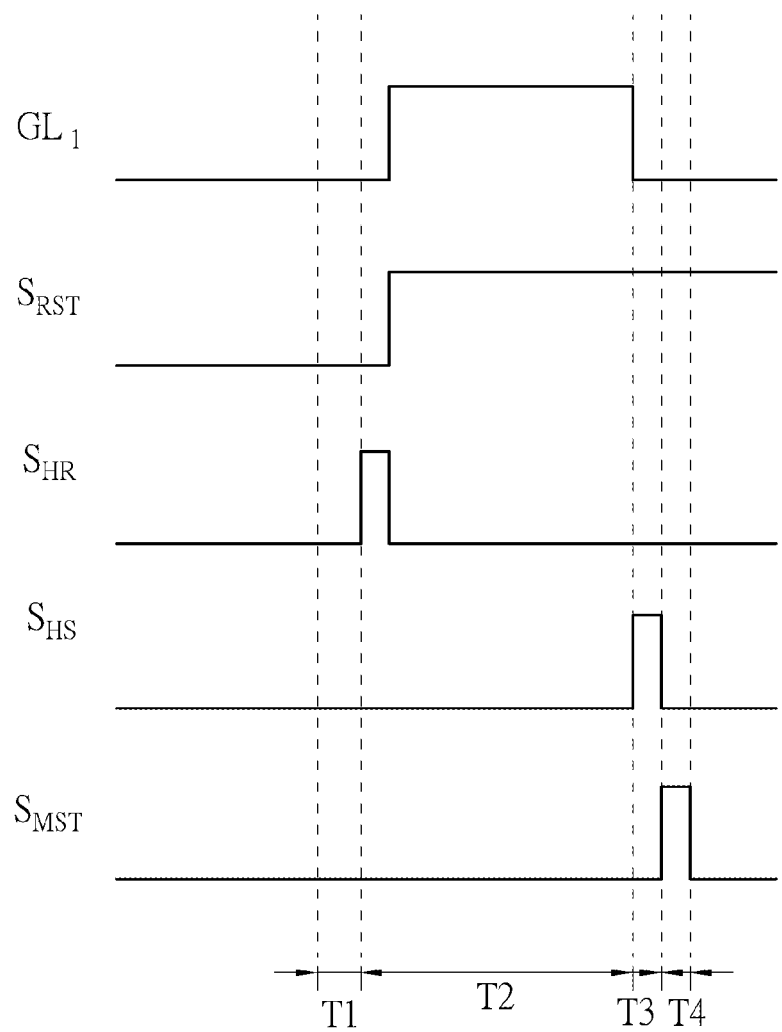
FIG. 7 is a schematic operation time sequence diagram of the reading circuit of FIG. 6.

The M bypass components BPE of the sensing module SNSM may be controlled by a sensing reset signal $S_{RST}$, the M reference sampling components REFC may be controlled by a reference sampling signal $S_{HR}$, and the M sensing sampling components SNSC may be controlled by a sensing sampling signal $S_{HS}$. FIG. 7 is an operation time sequence diagram of the reading unit 252' according to the embodiment of the present invention. In a first time segment T1 of FIG. 7, the gate line $GL_1$ is still not driven. At this time, the sensing reset signal $S_{RST}$ is of a low voltage, and the reference sampling signal $S_{HR}$ is of a high voltage. Therefore, the M bypass components BPE are enabled, and M reference sampling components REFC separately receive current flowing from M first read lines $RA_1$ to $RA_M$. At this time, the gate line $GL_1$ is not driven, and therefore, in the first time segment T1, voltages sampled by the M sensing sampling components REFC may be used as reference voltages.

In a second time segment T2 of FIG. 7, the gate line GL1 is driven to a high voltage, and the M first read lines $RA_1$ to $RA_M$ are sequentially driven to output the first light sensing voltages $VA_{11}$ to $VA_{1M}$ generated by the first light sensing elements $232_{11}$ to $232_{1M}$. At this time, the sensing reset signal $S_{SRST}$ is of a high voltage, and therefore, the M bypass components BPE are disabled, such that the M integrators INT can separately receive currents generated by the first light sensing voltages $VA_{11}$ to $VA_{1M}$ at the first read lines $RA_1$ to $RA_M$ and generate integral voltages.

In a third time segment T3 of FIG. 7, the sensing sampling signal $S_{HS}$ is changed to a high voltage, and therefore, the M sensing sampling components SNSC receive currents transmitted from the M integrators. In other words, in the third time segment T3, sensing voltages sampled by the M sensing sampling components SNSC are associated with the integral voltages generated by the M integrators, and therefore, are associated with the first light sensing voltages $VA_{11}$ to $VA_{1M}$.

In a fourth time segment T4 of FIG. 7, the shift register SR may sequentially generate M control signals according to a multiplex control signal $S_{MST}$, such that the multiplexer MUX sequentially feeds the reference voltages sampled by the M reference sampling components REFC and the sensing voltages sampled by the M sensing sampling components SNSC into two ends of the comparator CMP separately; the comparator CMP sequentially outputs M groups of comparison results obtained from comparing the sensing voltages and the reference voltages, and the analog to digital convertor ADC can sequentially convert analog signals output by the comparator CMP into digital signals. In this way, the reading unit 252' can output digital comparison results. Besides, for the time sequence of the sensing sampling signal $S_{HS}$, the sensing sampling signal $S_{HS}$ may be changed to a high voltage in a time segment that the gate line GL1 is driven to a high voltage, which is not limited herein in the present invention. The time sequence of the sensing sampling signal $S_{HS}$ may be adjusted according to actual requirements, or may undergo transition in a time segment that a gate line is driven to a low voltage.

Besides, in other embodiments of the present invention, the reading unit 252' may further include an additional multiplexer, and the additional multiplexer is coupled, according to a method similar to the foregoing method, to the M second read lines $RB_1$ to $RB_M$, so as to read the light sensing voltages generated by the second light sensing elements $234_{11}$ to $234_{NM}$.

Figure 8:
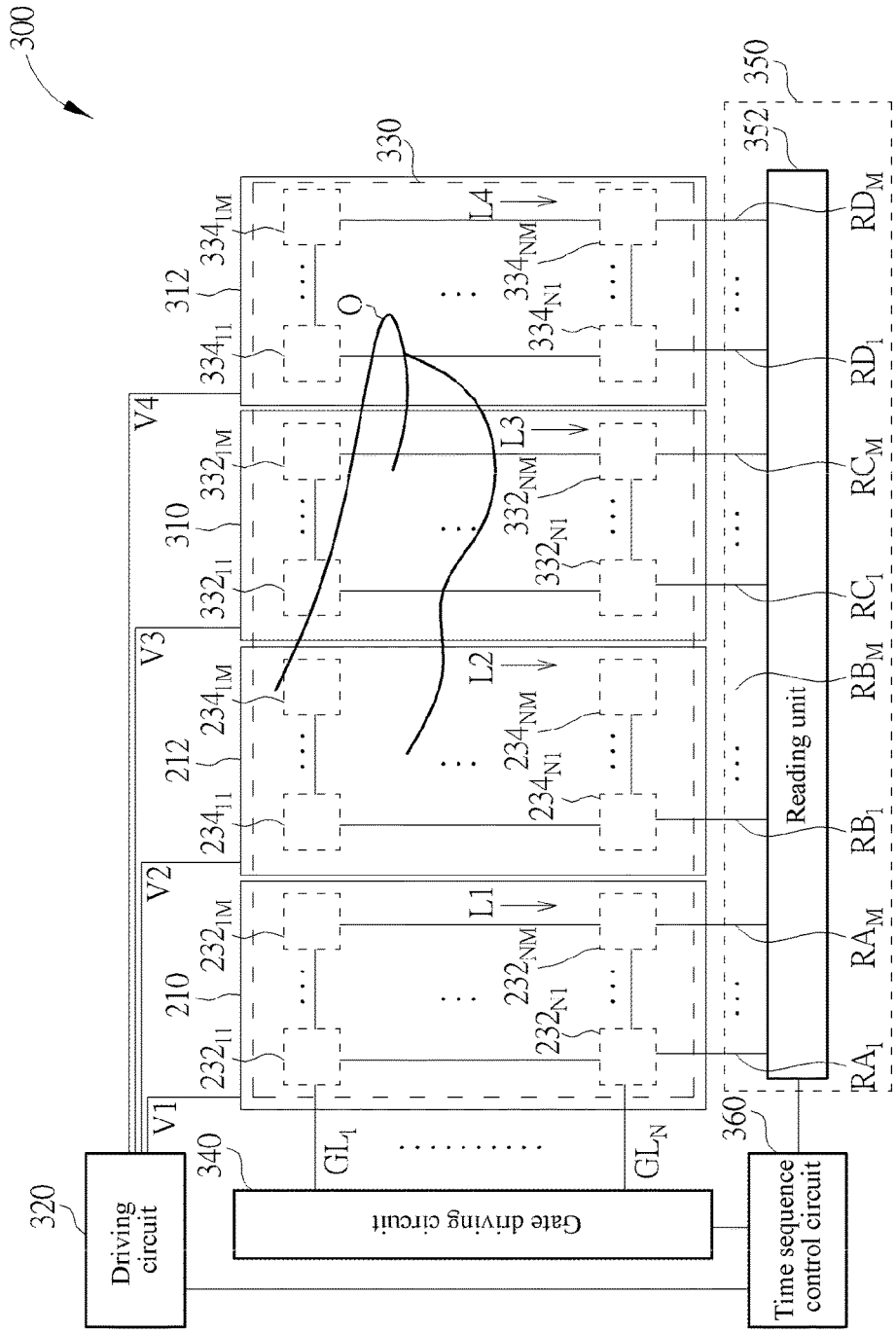
FIG. 8 is a schematic diagram of a fingerprint detector according to another embodiment of the present invention.
Figure 9:
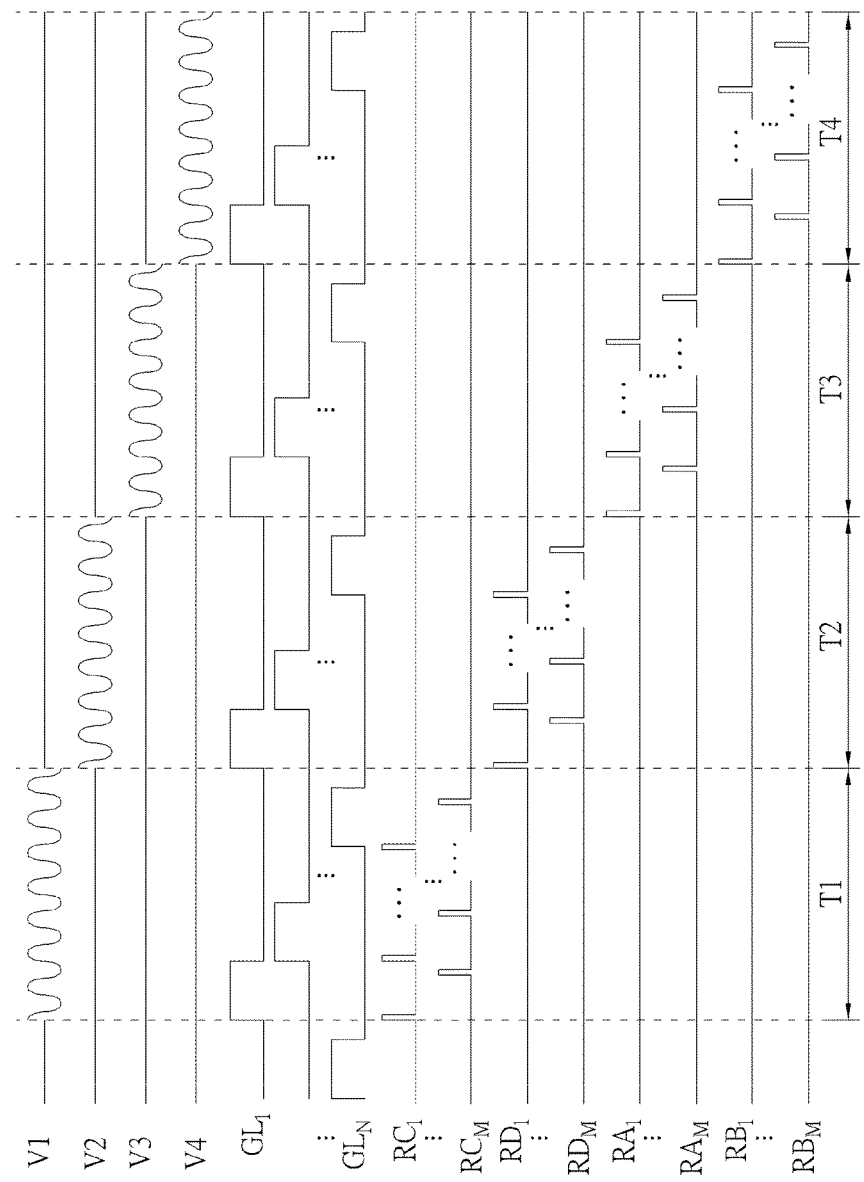
FIG. 9 is an operation time sequence diagram of the fingerprint detector of FIG. 8.

In other embodiments of the present invention, a fingerprint detector may include more LESs. FIG. 8 is a schematic diagram of a fingerprint detector 300 according to an embodiment of the present invention, and FIG. 9 is an operation time sequence diagram of the fingerprint detector 300 according to the embodiment of the present invention. The fingerprint detector 300 and the fingerprint detector 200 are of similar structures, and differ from each other in that the fingerprint detector 300 further includes a third LES 310 and a fourth LES 312.

In FIG. 8, the first LES 210, the second LES 212, the third LES 310, and the fourth LES 312 may be located at a same plane, the second LES 212 may be disposed between the first LES 210 and the third LES 310, and the third LES 310 may be disposed between the second LES 212 and the fourth LES 312. Operation principles of the third LES 310 and the fourth LES 312 are similar to the operation principle of the first LES 210. When being in contact with the object O, the third LES 310 can emit third scanning light L3, and when being in contact with the object O, the fourth LES 312 can emit fourth scanning light L4.

Besides, a driving circuit 320 of the fingerprint detector 300 can provide power to the first LES 210, the second LES 212, the third LES 310, and the fourth LES 312. In addition to the plurality of first light sensing elements $232_{11}$ to $232_{NM}$ disposed under the first LES 210 and the plurality of second light sensing elements $234_{11}$ to $234_{NM}$ disposed under the second LES 212, a sensing array 330 of the fingerprint detector 300 may further include a plurality of third light sensing elements $332_{11}$ to $332_{NM}$ and a plurality of fourth light sensing elements $334_{11}$ to $334_{NM}$. The plurality of third light sensing elements $332_{11}$ to $332_{NM}$ are disposed under the third LES 310, and the third light sensing elements $332_{11}$ to $332_{NM}$ can generate third light sensing voltages $VC_{11}$ to $VC_{NM}$ according to the received third scanning light L3. The plurality of fourth light sensing elements $334_{11}$ to $334_{NM}$ are disposed under the fourth LES 312, and the fourth light sensing elements $334_{11}$ to $334_{NM}$ can generate fourth light sensing voltages $VD_{11}$ to $VD_{NM}$ according to the received fourth scanning light L4.

A reading circuit 350 of the fingerprint detector 300 includes the plurality of first read lines $RA_1$ to $RA_M$, the plurality of second read lines $RB_1$ to $RB_M$, a plurality of third read lines $RC_1$ to $RC_M$, and a plurality of fourth read lines $RD_1$ to $RD_M$. Each of the third read lines $RC_1$ to $RC_M$ is coupled to a plurality of third light sensing elements of a same column in the plurality of third light sensing elements $332_{11}$ to $332_{NM}$, for example, the third read line $RC_1$ is coupled to the third light sensing elements $332_{11}$ to $332_{1M}$. Each of the fourth read lines $RD_1$ to $RD_M$ is coupled to a plurality of fourth light sensing elements of a same column in the plurality of fourth light sensing elements $334_{11}$ to $334_{NM}$, for example, the fourth read line $RD_1$ is coupled to the fourth light sensing elements $334_{11}$ to $334_{1M}$.

In FIG. 9, in a first time segment T1, a voltage V1 provided by the driving circuit 320 to the first LES 210 is an AC voltage, and a voltage V2 provided to the second LES 212, a voltage V3 provided to the third LES 310, and a voltage V4 provided to the fourth LES 312 are all DC voltages or high impedance. In a second time segment T2, the voltage V2 provided by the driving circuit 320 to the second LES 212 is an AC voltage, and the voltage V1 provided to the first LES 210, the voltage V3 provided to the third LES 310, and the voltage V4 provided to the fourth LES 312 are all DC voltages or high impedance. In a third time segment T3, the voltage V3 provided by the driving circuit 320 to the third LES 310 is an AC voltage, and the voltage V1 provided to the first LES 210, the voltage V2 provided to the second LES 212, and the voltage V4 provided to the fourth LES 312 are all DC voltages or high impedance. In a fourth time segment T4, the voltage V4 provided by the driving circuit 320 to the fourth LES 312 is an AC voltage, and the voltage V1 provided to the first LES 210, the voltage V2 provided to the second LES 212, and the voltage V3 provided to the third LES 310 and are all DC voltages or high impedance. The first time segment T1, the second time segment T2, the third time segment T3, and the fourth time segment T4 do not overlap.

That is, the first LES 210 emits light when being in the first time segment T1 and being in contact with an object, the second LES 212 emits light when being in the second time segment T2 and being in contact with an object, the third LES 310 emits light when being in the third time segment T3 and being in contact with an object, and the fourth LES 312 emits light when being in the fourth time segment T4 and being in contact with an object.

Besides, in order to enable the light sensing components read by the reading circuit 350 to be farther away from positions that can generate high-voltage ACs and further to prevent a process of reading the light sensing voltages from being affected by the high-voltage ACs, in the embodiment of FIG. 9, in the first time segment T1, a reading unit 352 reads, through the third read lines $RC_1$ to $RC_M$, third light sensing voltages generated by third light sensing elements in different columns of a row of light sensing elements driven by the gate driving circuit 340; in the second time segment T2, the reading unit 350 reads, through the fourth read lines $RD_1$ to $RD_M$, fourth light sensing voltages generated by fourth light sensing elements in different columns of a row of light sensing elements driven by the gate driving circuit 340; in the third time segment T3, the reading unit 350 reads, through the first read lines $RA_1$ to $RA_M$, first light sensing voltages generated by first light sensing elements in different columns of a row of light sensing elements driven by the gate driving circuit 340; and in the fourth time segment T4, the reading unit 350 reads, through the second read lines $RB_1$ to $RB_M$, second light sensing voltages generated by second light sensing elements in different columns of a row of light sensing elements driven by the gate driving circuit 340.

For example, in the first time segment T1, when the gate driving circuit 340 drives third light sensing elements $332_{11}$ to $332_{1M}$ of a same row through the gate line $GL_1$, the reading circuit 350 sequentially reads, through the plurality of third read lines $RC_1$ to $RC_M$, third light sensing voltages $VC_{11}$ to $VC_{1M}$ generated by third light sensing elements in different columns of the third light sensing elements $332_{11}$ to $332_{1M}$. In the second time segment T2, when the gate driving circuit 340 drives fourth light sensing elements $334_{11}$ to $334_{1M}$ of a same row through the gate line $GL_1$, the reading circuit 350 sequentially reads, through the plurality of fourth read lines $RD_1$ to $RD_M$, fourth light sensing voltages $VD_{11}$ to $VD_{1M}$ generated by fourth light sensing elements in different columns of the fourth light sensing elements $334_{11}$ to $334_{1M}$. In the third time segment T3, when the gate driving circuit 340 drives first light sensing elements $232_{11}$ to $232_{1M}$ of a same row through the gate line $GL_1$, the reading circuit 350 sequentially reads, through the plurality of first read lines $RA_1$ to $RA_M$, first light sensing voltages $VA_{11}$ to $VA_{1M}$ generated by first light sensing elements in different columns of the first light sensing elements $232_{11}$ to $232_{1M}$. In the fourth time segment T4, when the gate driving circuit 340 drives second light sensing elements $234_{11}$ to $234_{1M}$ of a same row through the gate line $GL_1$, the reading circuit 350 sequentially reads, through the plurality of second read lines $RB_1$ to $RB_M$, second light sensing voltages $VB_{11}$ to $VB_{1M}$ generated by second light sensing elements in different columns of the second light sensing elements $234_{11}$ to $234_{1M}$.

In this way, when the fingerprint detector 300 reads, in the first time segment T1, the third light sensing voltages $VC_{11}$ to $VC_{1M}$ generated by the third light sensing elements $332_{11}$ to $332_{1M}$, the second LES 212 and the fourth LES 312 that are adjacent to the third LES 310 do not receive high-voltage ACs, so as to further prevent the high-voltage ACs from affecting accuracy of reading, by the reading circuit 350, the light sensing voltages $VC_{11}$ to $VC_{1M}$. Likewise, when the fingerprint detector 300 reads light sensing voltages generated by light sensing elements, an LES above the read light sensing elements and an LES adjacent to the LES above the read light sensing elements do not receive high-voltage ACs, so as to effectively reduce an impact of the high-voltage ACs on the reading circuit 350.

Figure 10:
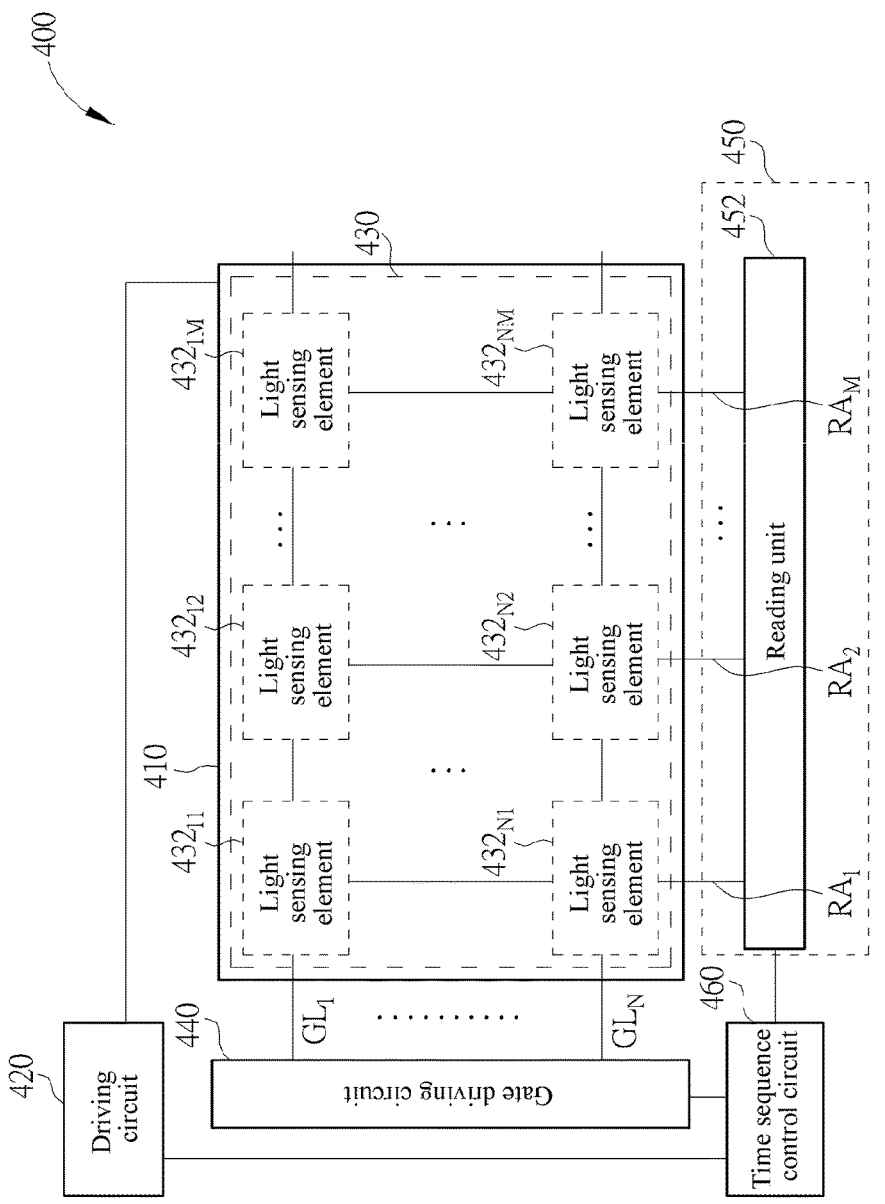
FIG. 10 is a schematic diagram of a fingerprint detector according to still another embodiment of the present invention.

FIG. 10 is a schematic diagram of a fingerprint detector 400 according to an embodiment of the present invention. The fingerprint detector 400 and the fingerprint detector 200 are of similar structures. The fingerprint detector 400 may include an LES 410, a driving circuit 420, a sensing array 430, a gate driving circuit 440, a reading circuit 450, and a time sequence control circuit 460. The sensing array 430 includes a plurality of light sensing elements $432_{11}$ to $432_{NM}$ disposed under the LES 410, and a reading circuit 350 of the fingerprint detector 400 includes a plurality of read lines $RA_1$ to $RA_M$.

Figure 11:
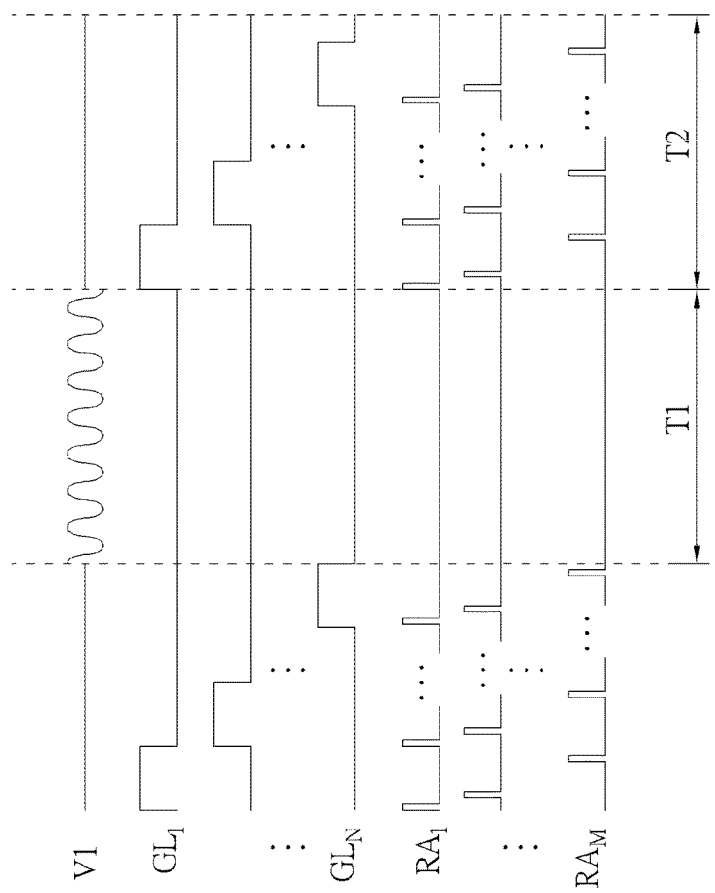
FIG. 11 is an operation time sequence diagram of the fingerprint detector of FIG. 10.

FIG. 11 is an operation time sequence diagram of the fingerprint detector 400 according to the embodiment of the present invention. A first time segment T1 and a second time segment T2 do not overlap. In the first time segment T1, a voltage V1 provided by a driving circuit 420 of the fingerprint detector 400 to the LES 410 is an AC voltage, and in the second time segment T2, the voltage V1 provided by the driving circuit 420 to the LES 410 is a DC voltage or high impedance. In the second time segment T2, a gate driving circuit 340 sequentially drives a plurality of rows of light sensing elements $432_{11}$ to $432_{1M}$, $432_{21}$ to $432_{2M}$, . . . , and $432_{N1}$ to $432_{NM}$ through a plurality of gate lines $GL_1$ to $GL_N$.

Specifically, in the embodiment of FIG. 11, in the time segment after the gate driving circuit 340 drives a plurality of rows of light sensing elements $432_{N1}$ to $432_{NM}$ through the gate line $GL_N$, and before the gate driving circuit 340 continues to drive a plurality of rows of light sensing elements $432_{11}$ to $432_{1M}$ through the gate line $GL_1$ again, that is, in the first time segment T1, the driving circuit 420 of the fingerprint detector 400 outputs an AC voltage to the LES 410, so as to enable the LES 410 to emit scanning light; and in a time segment that the gate driving circuit 340 sequentially drives the plurality of rows of light sensing elements $432_{11}$ to $432_{1M}$, $432_{21}$ to $432_{2M}$, ..., and $432_{N1}$ to $432_{NM}$ through the plurality of gate lines $GL_1$ to $GL_N$, that is, in the second time segment T2, the driving circuit 420 stops outputting the AC voltage to the LES 410, so as to avoid a situation that the reading circuit 250 fails, due to an impact of the high-voltage AC applied to the reading circuit 250 when the reading circuit 250 reads the light sensing voltages, to accurately read the light sensing voltages generated by the light sensing elements.

In this way, when the fingerprint detector 400 reads the light sensing voltages generated by the light sensing elements, the LES above the read light sensing elements does not receive the high-voltage AC, so as to effectively reduce an impact of the high-voltage AC on the reading circuit 450, and further to improve accuracy of reading, by the reading circuit 450, the light sensing voltages generated by the light sensing elements.

Figure 12:
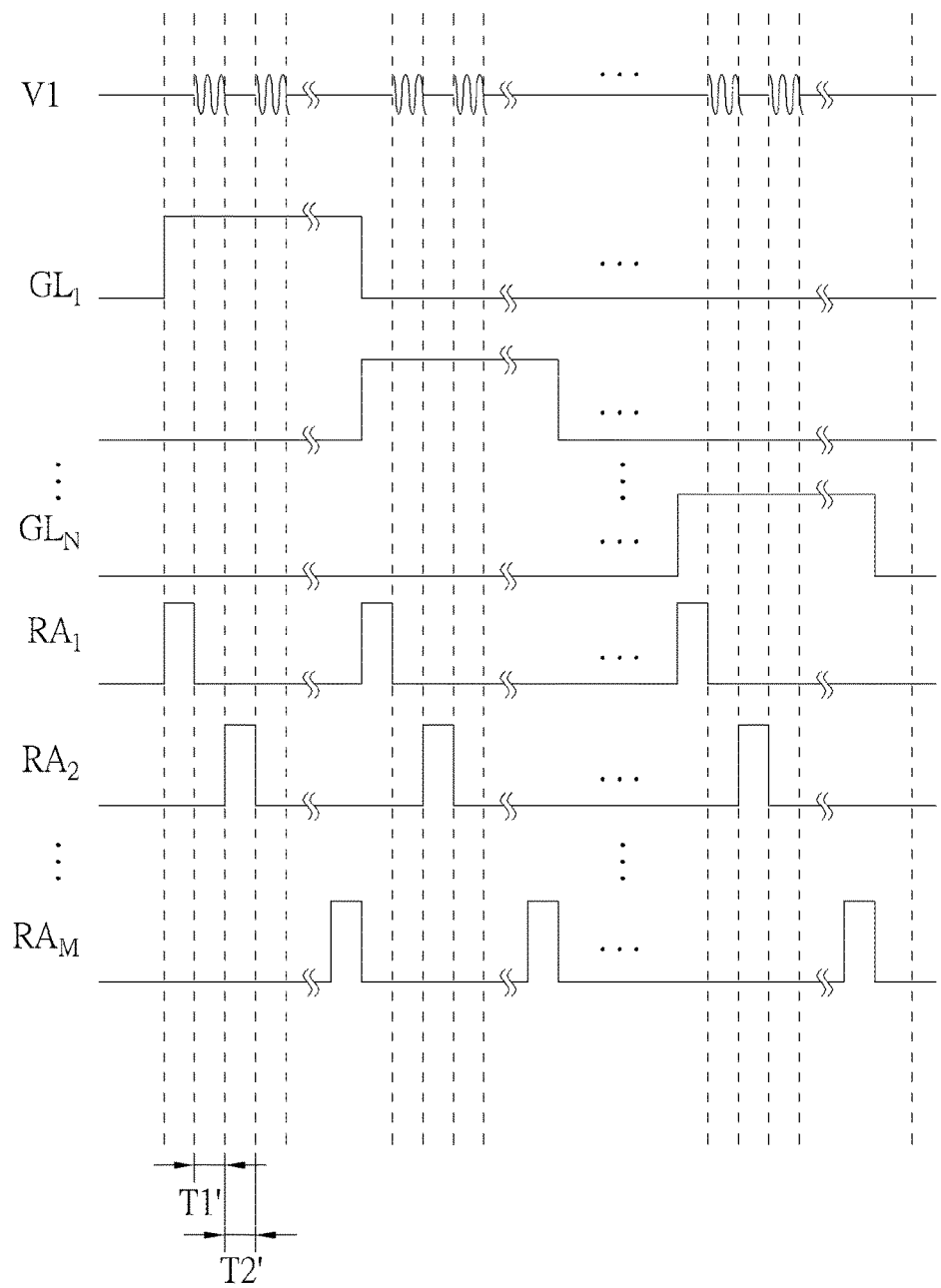
FIG. 12 is another operation time sequence diagram of the fingerprint detector of FIG. 10.

In other implementations of the present invention, the fingerprint detector 400 may be operated according to different time sequences. FIG. 12 is an operation time sequence diagram of the fingerprint detector 400 according to another embodiment of the present invention. In FIG. 12, after the reading unit 452 reads a corresponding first light sensing voltage through a read line (e.g. the read line $RA_1$), and before the reading unit 452 reads a corresponding first light sensing voltage through a next read line (e.g. the read line $RA_2$) (e.g. in a time segment T1'), the driving circuit 420 enables a voltage V1 provided to the LES 410 to be an AC voltage, and when the read unit 450 reads a corresponding first light sensing voltage through a read line (e.g. the read line $RA_2$) (e.g. in a time segment T2'), the driving circuit 420 enables the voltage V1 provided to the LES 410 to be a DC voltage or high impedance.

Besides, in some embodiments of the present invention, in a time segment that the gate lines $GL_1$ to $GL_N$ are driven to high voltages, and in a time segment that corresponding first light sensing voltages are read through the read lines $RA_1$ to $RA_M$, the fingerprint detector 400 may enable the voltage V1 provided to the LES 410 to be a DC voltage or high impedance, and enable, after the reading of the corresponding first light sensing voltages is completed, the voltage V1 provided to the LES 410 to be an AC voltage.

Specifically, only when the reading unit 452 does not read a light sensing voltage through a read line, the driving circuit 420 outputs an AC voltage to the LES 410, so as to enable the LES 410 to emit scanning light. In this way, when the fingerprint detector 400 reads the light sensing voltages generated by the light sensing elements, the LES above the read light sensing elements does not receive the high-voltage AC, so as to effectively reduce an impact of the high-voltage AC on the reading circuit 450, and further to improve accuracy of reading, by the reading circuit 450, the light sensing voltages generated by the light sensing elements.

Besides, in some embodiments of the present invention, the fingerprint detector 400 may further combine the embodiment of FIG. 11 and the embodiment of FIG. 12. For example, besides a situation that the driving circuit 420 of the fingerprint detector 400 outputs the AC voltage to the LES 410 in the first time segment T1 shown in FIG. 11, the driving circuit 420 of the fingerprint detector 400 may output an AC voltage AC1 to the LES 410 after the reading unit 452 reads a corresponding first light sensing voltage through a read line (e.g. the read line $RA_1$) and before the reading unit 452 reads a corresponding first light sensing voltage through a next read line (e.g. the read line $RA_2$), as shown in FIG. 12. Moreover, in other time segments than the foregoing time segment, the driving circuit 420 may stop outputting the AC voltage AC1 to the LES 410.

In this way, when the fingerprint detector 400 reads the light sensing voltages generated by the light sensing elements, the LES above the read light sensing elements does not receive the high-voltage AC, so as to effectively reduce an impact of the high-voltage AC on the reading circuit 450, and further to improve accuracy of reading, by the reading circuit 450, the light sensing voltages generated by the light sensing elements.

To sum up, the fingerprint detector provided in the present invention can enable a high-voltage AC needed by an LES to be far away from light sensing elements read by a reading circuit, or avoid generation of a high-voltage AC when the reading circuit reads light sensing voltages generated by the light sensing elements, so as to effectively reduce an impact of the high-voltage AC on the reading circuit of the fingerprint detector, and further to improve accuracy of reading, by the fingerprint detector, the light sensing voltages generated by the light sensing elements.

The foregoing descriptions are merely preferred embodiments of the present invention, and equivalent variations and modifications made according to the claims of the present invention all fall within the scope of the present invention.

What is claimed is:

1. A fingerprint detector, comprising:
a first light emitting structure (LES), for emitting when an object is in contact with a part of the first LES, first scanning light from the part of the first LES;
a second LES, for emitting when the object is in contact with a part of the second LES, second scanning light from the part of the second LES, wherein the first LES and the second LES are isolated from one another; and
a sensing array, comprising:
a plurality of first light sensing elements, disposed under the first LES, wherein each of the first light sensing elements generates a first light sensing voltage according to the first scanning light; and
a plurality of second light sensing elements, disposed under the second LES, wherein each of the second light sensing elements generates a second light sensing voltage according to the second scanning light;
a gate driving circuit, comprising a plurality of gate lines, wherein each of the gate lines is coupled to a plurality of light sensing elements of a same row in the first light sensing elements and the second light sensing elements, and the gate driving circuit sequentially drives a plurality of rows of light sensing elements through the gate lines;
a reading circuit, comprising:
a plurality of first read lines, wherein each of the first read lines is coupled to a plurality of light sensing elements of a same column in the first light sensing elements;
a plurality of second read lines, wherein each of the second read lines is coupled to a plurality of light sensing elements of a same column in the second light sensing elements; and
a reading unit, coupled to the first read lines and the second read lines, and when the gate driving circuit drives a row of light sensing elements, sequentially or synchronously read first light sensing voltages generated by first light sensing elements in different columns of the row of first light sensing element through the first read lines, or sequentially or synchronously read second light sensing voltages generated by second light sensing elements in different columns of row of second light sensing elements through the second read lines.

2. The fingerprint detector according to claim 1, wherein a phase difference between an alternating current (AC) voltage provided by a driving circuit to the first LES and an AC voltage provided by the driving circuit to the second LES is substantially 180 degrees.

3. The fingerprint detector according to claim 1, further comprising a driving circuit coupled to the first LES and the second LES, wherein
the driving circuit provides a first AC voltage to the first LES in a first time segment, and provides a second AC voltage to the second LES in a second time segment;
in the first time segment, the driving circuit stops providing the second AC voltage to the second LES;
in the second time segment, the driving circuit stops providing the first AC voltage to power the first LES; and
the first time segment and the second time segment do not overlap.

4. The fingerprint detector according to claim 3, wherein
in the first time segment, when the gate driving circuit drives the row of light sensing elements, the reading unit sequentially or synchronously read the second light sensing voltages generated by the second light sensing elements in different columns of the row of light sensing elements through the second read lines; and
in the second time segment, when the gate driving circuit drives the row of light sensing elements, the reading unit sequentially or synchronously read the first light sensing voltages generated by the first light sensing elements in different columns of the row of light sensing elements through the first read lines.

5. The fingerprint detector according to claim 1, further comprising:
a driving circuit coupled to the first LES and the second LES;
a third LES, for emitting third scanning light; and
a fourth LES, for emitting fourth scanning light, wherein
the second LES is disposed between the first LES and the third LES, and the third LES is disposed between the second LES and the fourth LES;
the sensing array further comprises:
a plurality of third light sensing elements, disposed under the third LES, wherein each of the third light sensing elements generates a third light sensing voltage according to the third scanning light; and
a plurality of fourth light sensing elements, disposed under the fourth LES, wherein each of the fourth light sensing elements generates a fourth light sensing voltage according to the fourth scanning light; and
the reading circuit further comprises:
a plurality of third read lines, wherein each of the third read lines is coupled to a plurality of third light sensing elements of a same column in the third light sensing elements; and
a plurality of fourth read lines, wherein each of the fourth read lines is coupled to a plurality of fourth light sensing elements of a same column in the fourth light sensing elements.

6. The fingerprint detector according to claim 5, wherein
the driving circuit only provides a first AC voltage to the first LES in a first time segment, only provides a second AC voltage to the second LES in a second time segment, only provides a third AC voltage to the third LES in a third time segment, and only provides a fourth AC voltage to the fourth LES in a fourth time segment; and
the first time segment, the second time segment, the third time segment, and the fourth time segment do not overlap.

7. The fingerprint detector according to claim 6, wherein
in the first time segment, when the gate driving circuit drives the row of light sensing elements, the reading unit sequentially or synchronously read third light sensing voltages generated by third light sensing elements in different columns of the row of light sensing elements through the third read lines;
in the second time segment, when the gate driving circuit drives the row of light sensing elements, the reading unit sequentially or synchronously read fourth light sensing voltages generated by fourth light sensing elements in different columns of the row of light sensing elements through the fourth read lines;
in the third time segment, when the gate driving circuit drives the row of light sensing elements, the reading unit sequentially or synchronously read the first light sensing voltages generated by the first light sensing elements in different columns of the row of light sensing elements through the first read lines; and
in the fourth time segment, when the gate driving circuit drives the row of light sensing elements, the reading unit sequentially or synchronously read the second light sensing voltages generated by the second light sensing elements in different columns of the row of light sensing elements through the second read lines.

8. The fingerprint detector according to claim 1, wherein the reading unit comprises:
a multiplexer, coupled to the first read lines and the second read lines, for enabling or disabling, according to control of a time sequence control circuit, electrical connections between the first read lines and the second read lines and one output end of the multiplexer;
an integrator, having a first input end coupled to the output end of the multiplexer, a second input end receiving a bias, and an output end outputting an integral voltage according to an input from the first input end; and
a bypass switch, having a first end coupled to the first input end of the integrator, a second end coupled to the output end of the integrator, and a control end coupled to the time sequence control circuit.

9. A fingerprint detector, comprising:
a light emitting structure (LES), for emitting scanning light from a part of the LES when an object is in contact with the part of the LES;
a driving circuit, coupled to the LES, for providing power to the LES for emitting light;
a sensing array, comprising a plurality of light sensing elements disposed under the LES, wherein each of the light sensing elements generates a light sensing voltage according to the scanning light;
a gate driving circuit, comprising a plurality of gate lines, wherein each of the gate lines is coupled to a plurality of light sensing elements of a same row in the light sensing elements, and the gate driving circuit sequentially drives a plurality of rows of light sensing elements through the gate lines;

a reading circuit, comprising:
   a plurality of read lines, wherein each of the read lines is coupled to a plurality of light sensing elements of a same column in the light sensing elements; and
   a reading unit, coupled to the read lines, for reading light sensing voltages generated by light sensing elements in different columns of the row of light sensing elements through the read lines when the gate driving circuit drives a row of light sensing elements,; and
a time sequence control circuit, coupled to the driving circuit, the gate driving circuit, and the reading circuit, for controlling the driving circuit, the gate driving circuit, and the reading circuit,
wherein
the driving circuit provides an AC voltage to the LES in a first time segment;
the gate driving circuit sequentially drives the plurality of rows of light sensing elements through the gate lines in a second time segment;
in the second time segment, driving circuit stops providing the AC voltage to the LES; and
the first time segment and the second time segment do not overlap.

10. A fingerprint detector, comprising:
a light emitting structure (LES), for emitting, when an object is in contact with a part of the LES, scanning light from the part of the LES;
a driving circuit, coupled to the LES, for providing power to the LES for emitting light;
a sensing array, comprising a plurality of light sensing elements disposed under the LES, wherein each of the light sensing elements generates a light sensing voltage according to the scanning light;
a gate driving circuit, comprising a plurality of gate lines, wherein each of the gate lines is coupled to a plurality of light sensing elements of a same row in the light sensing elements, and the gate driving circuit sequentially drives a plurality of rows of light sensing elements through the gate lines;
a reading circuit, comprising:
   a plurality of read lines, wherein each of the read lines is coupled to a plurality of light sensing elements of a same column in the light sensing elements; and
   a reading unit, coupled to the read lines, for reading light sensing voltages generated by light sensing elements in different columns of the row of light sensing elements through the read lines when the gate driving circuit drives a row of light sensing elements; and
a time sequence control circuit, coupled to the driving circuit, the gate driving circuit, and the reading circuit, for controlling the driving circuit, the gate driving circuit, and the reading circuit, wherein
the driving circuit provides an AC voltage to the LES after the reading unit reads a corresponding light sensing voltage through a first read line and before the reading unit reads a corresponding light sensing voltage through a second read line next to the first read line, and stops providing the AC voltage to the LES when the reading unit is reading a corresponding light sensing voltage through the first read line.

11. The fingerprint detector according to claim 10, wherein the driving circuit provides a direct current (DC) voltage to the LES when the reading unit is reading a corresponding light sensing voltage through the first read line.

* * * * *